US012583355B2

(12) United States Patent
Saito et al.

(10) Patent No.: US 12,583,355 B2
(45) Date of Patent: Mar. 24, 2026

(54) BATTERY REPLACEMENT APPARATUS

(71) Applicant: TOYOTA JIDOSHA KABUSHIKI KAISHA, Toyota (JP)

(72) Inventors: Mamoru Saito, Toyota (JP); Shin Inoue, Okazaki (JP); Naoki Takahashi, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 262 days.

(21) Appl. No.: 18/512,879

(22) Filed: Nov. 17, 2023

(65) Prior Publication Data

US 2024/0181920 A1     Jun. 6, 2024

(30) Foreign Application Priority Data

Dec. 5, 2022     (JP) ................................. 2022-194388

(51) Int. Cl.
  *B60L 53/80*          (2019.01)
  *B60K 1/04*           (2019.01)
  *B66F 9/075*          (2006.01)
(52) U.S. Cl.
  CPC ................ *B60L 53/80* (2019.02); *B60K 1/04* (2013.01); *B66F 9/0754* (2013.01); *B60K 2001/0472* (2013.01)

(58) Field of Classification Search
  CPC ... B60L 53/80; B60K 1/04; B60K 2001/0472; B66F 9/0754; B60S 5/06
  See application file for complete search history.

(56) References Cited

U.S. PATENT DOCUMENTS

2012/0233850 A1     9/2012  Hozumi et al.
2020/0331358 A1*   10/2020  Lee .......................... B60K 1/04
2022/0203854 A1*    6/2022  Yu ........................... B60L 53/30
2023/0242001 A1*    8/2023  Li ........................... B60L 53/80
                                                          180/68.5

FOREIGN PATENT DOCUMENTS

JP      H10- 035297  A     2/1998
JP      2012-006498  A     1/2012
JP      2012-192783  A    10/2012
WO      2010/035605  A1    4/2010

* cited by examiner

*Primary Examiner* — Lori Wu
(74) *Attorney, Agent, or Firm* — Dinsmore & Shohl LLP

(57)          ABSTRACT

A battery replacement apparatus includes: a battery replacement station where removal of a first battery from the electrically powered vehicle and attachment of a second battery to the electrically powered vehicle are performed; a storage that stores the second battery, and a storage space that is provided at a position separate from the storage and stores the first battery.

3 Claims, 5 Drawing Sheets

BATTERY REPLACEMENT APPARATUS

This nonprovisional application is based on Japanese Patent Application No. 2022-194388 filed on Dec. 5, 2022 with the Japan Patent Office, the entire contents of which are hereby incorporated by reference.

BACKGROUND

Field

The present disclosure relates to a battery replacement apparatus.

Description of the Background Art

Japanese Patent Application Laid-Open No. 2012-192783 discloses a battery replacement apparatus that replaces a battery mounted on an electrically powered vehicle with a charged battery. The battery replacement apparatus includes a battery mounting table provided below the electrically powered vehicle and on which the battery is mounted, and battery conveying means for conveying the battery. The battery transport means transports the used battery removed from the electrically powered vehicle and mounted on the battery mounting table to the battery storage unit, and transports the charged battery stored in the battery storage unit to the battery mounting table.

SUMMARY

In the battery replacement apparatus described in Japanese Patent Application Laid-Open No. 2012-192783, since a charged battery and a battery immediately after being removed from the electrically powered vehicle and which is not completely charged are stored in the same space, management becomes difficult.

It is an object of the present disclosure to provide a battery replacement apparatus capable of simplifying battery management.

A battery replacement apparatus according to one aspect of the present disclosure is a battery replacement apparatus for replacing a used first battery attached to an electrically powered vehicle with a charged second battery, and the battery replacement apparatus includes: a battery replacement station where removal of the first battery from the electrically powered vehicle and attachment of the second battery to the electrically powered vehicle are performed; a storage that stores the second battery; and a storage space that is provided at a position separate from the storage and stores the first battery.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Figure 1:
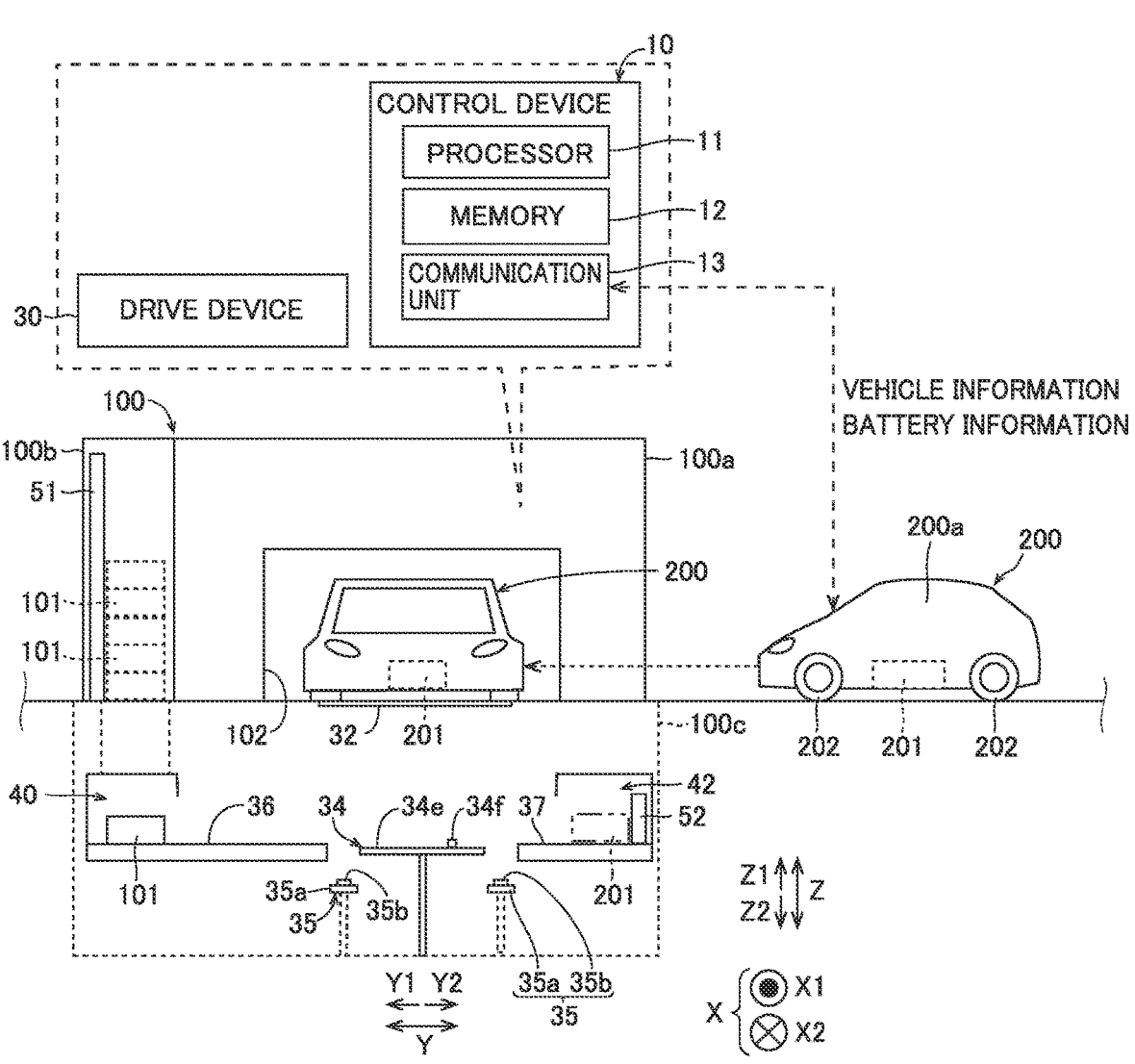
FIG. 1 schematically shows a battery replacement apparatus according to an embodiment of the present disclosure.

Hereinafter, embodiments of the present disclosure will be described in detail with reference to the accompanying drawings. In the drawings, the same or corresponding parts are denoted by the same reference numerals, and the description thereof will not be repeated.

(Configuration of Battery Replacement Apparatus)

FIG. 1 is a diagram showing a battery replacement apparatus 100 and an electrically powered vehicle 200 according to the present embodiment. The battery replacement apparatus 100 is a device for replacing a battery (used battery) 201 attached to the electrically powered vehicle 200 with a charged battery (new battery) 101. The battery 201 and the battery 101 are examples of the "first battery" and the "second battery" of the present disclosure, respectively. The battery replacement apparatus 100 includes a battery replacement station 100a, a storage 100b, and an underfloor area 100c.

The battery replacement station 100a is a station in which the battery 201 is detached from the electrically powered vehicle 200 and the battery 101 is attached to the electrically powered vehicle 200. The battery replacement station 100a is provided with an entrance/exit 102 for the electrically powered vehicle 200 to enter/exit.

The storage 100b stores the charged battery 101. The storage 100b is provided in parallel with the battery replacement station 100a. A charging facility 51 capable of charging the battery 201 removed from the electrically powered vehicle 200 is provided in the storage 100b. The battery 201 is charged by the charging facility 51 in the storage 100b. The battery 101 charged in the storage 100b, that is, the charged battery 101 is moved to the temporary placement site 40 provided in the underfloor area 100c, and then conveyed to the electrically powered vehicle 200.

The underfloor area 100c is provided below the battery replacement station 100a and the storage 100b. The underfloor area 100c is provided with a battery mounting table 34, a raising and lowering unit 35, a first transport unit 36, and a second transport unit 37, which will be described later.

The battery replacement apparatus 100 includes a control device 10 and a drive device 30.

The control device 10 includes a processor (controller) 11, a memory 12, and a communication unit 13. The memory 12 stores, in addition to a program executed by the processor 11, information (e.g., map, formula, and various parameters) used by the program. As will be described in detail later, the processor 11 controls the drive device 30.

The communication unit 13 includes various communication I/Fs. The processor 11 controls the communication unit 13. The communication unit 13 communicates with a DCM or the like of the electrically powered vehicle 200. The communication unit 13 and the electrically powered vehicle 200 can perform bidirectional communication. The communication unit 13 may communicate with a mobile terminal or the like possessed by the user of the electrically powered vehicle 200.

Figure 2:
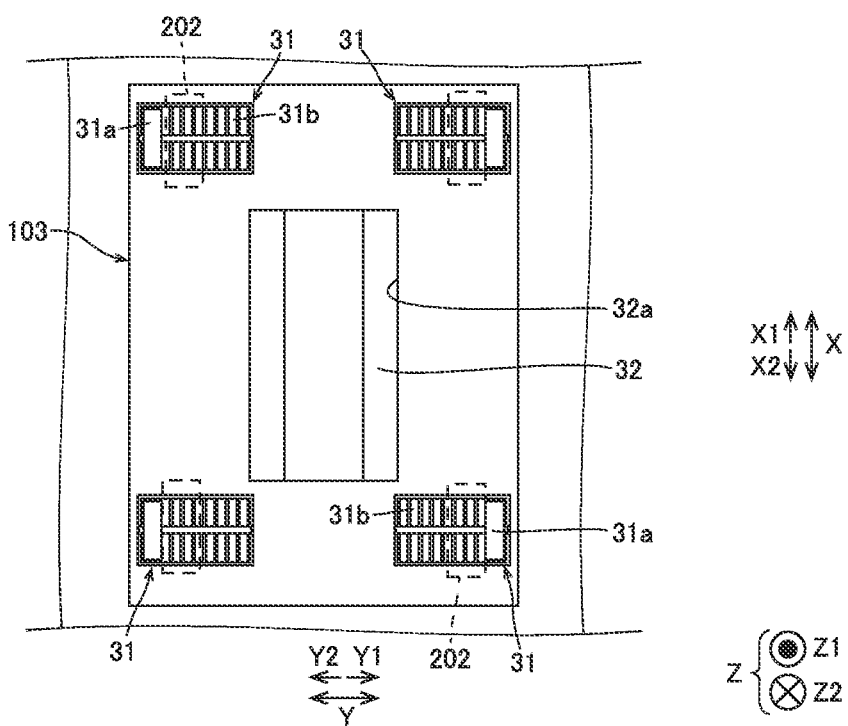
FIG. 2 is a plan view showing a vehicle stop area in the battery replacement apparatus.

As shown in FIG. 2, the battery replacement apparatus 100 is provided with a vehicle stop area 103. In a state in which the electrically powered vehicle 200 is stopped in the vehicle stop area 103, when the user performs an operation for instructing the start of the battery replacement operation in a navigation system (not shown) of the electrically powered vehicle 200, the communication unit 13 receives an instruction signal for starting the battery replacement operation from the electrically powered vehicle 200. The processor 11 starts the control of the battery replacement operation based on the reception of the instruction signal by the communication unit 13. The electrically powered vehicle 200 stops in the vehicle stop area 103 such that the front-rear direction is the X direction and the left-right direction is the Y direction.

The drive device 30 includes a wheel chock 31 (see FIG. 2), a shutter 32 (see FIG. 2), a battery mounting table 34 (see FIG. 1), a raising and lowering unit 35 (see FIG. 1), a first transport unit 36 (see FIG. 1), and a second transport unit 37 (see FIG. 1).

Referring again to FIG. 2, in vehicle stop area 103, four wheel chocks 31 are provided. The wheel chocks 31 are provided so as to correspond to the four wheels 202 of the electrically powered vehicle 200.

The wheel chock 31 includes a pressing member 31a and a lateral roller portion 31b. The pressing member 31a moves the wheel 202 by pressing the wheel 202 from the outside (side). The pressing member 31a is disposed so as to straddle the lateral roller portion 31b. As a result, the wheel 202 is positioned by the wheel chock 31.

The lateral roller portion 31b includes a plurality of rollers whose rotation axes extend in the X direction. The plurality of rollers of the lateral roller portion 31b are arranged in the Y direction. By the rotation of the plurality of rollers of the lateral roller portion 31b, the pressing member 31a is moved along the Y direction.

As shown in FIG. 2, the shutter 32 is provided in the vehicle stop area 103. The shutter 32 is configured to be able to open and close an opening 32a formed in the floor FL of the vehicle stop area 103. The shutter 32 can be switched between an open state in which the opening 32a is opened and a closed state in which the opening 32a is closed.

Figure 3:
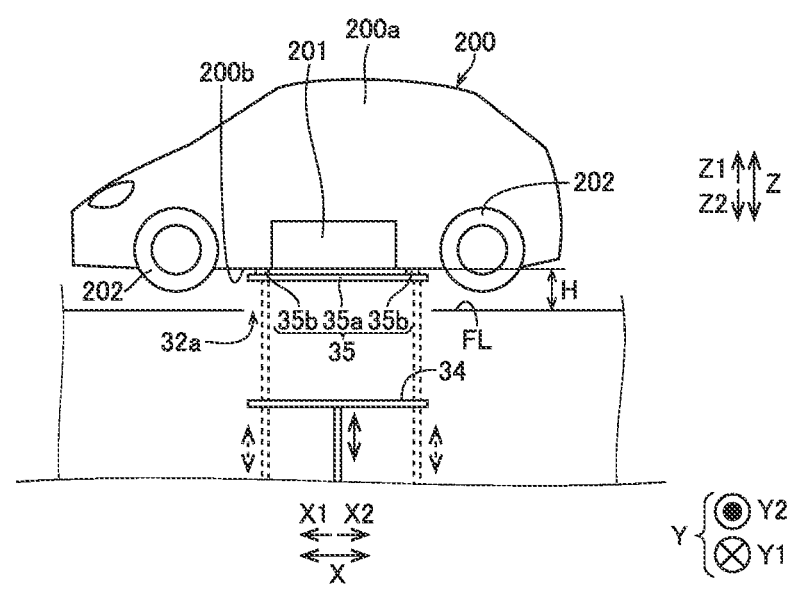
FIG. 3 is a diagram schematically showing a configuration of a battery mounting table and a raising and lowering unit.

The raising and lowering unit 35 is movable in the vertical direction between a position higher than the floor FL and a position lower than the floor FL through the opening 32a. As shown in FIG. 3, the raising and lowering unit 35 can raise the electrically powered vehicle 200 from below to a position where the wheels 202 of the electrically powered vehicle 200 float from the floor FL. The raising and lowering unit 35 raises the electrically powered vehicle so that the height H of the lower surface 200b of the vehicle body 200a from the floor FL becomes a predetermined height.

The raising and lowering unit 35 includes a pair of elevation bars 35a arranged at intervals in a direction (Y direction) orthogonal to the vertical direction. Each of the pair of elevation bars 35a is provided with two protrusions 35b protruding upward. The electrically powered vehicle 200 is supported from below by two protrusions 35b (i.e., four protrusions 35b) of each of the pair of elevation bars 35a.

Figure 4:
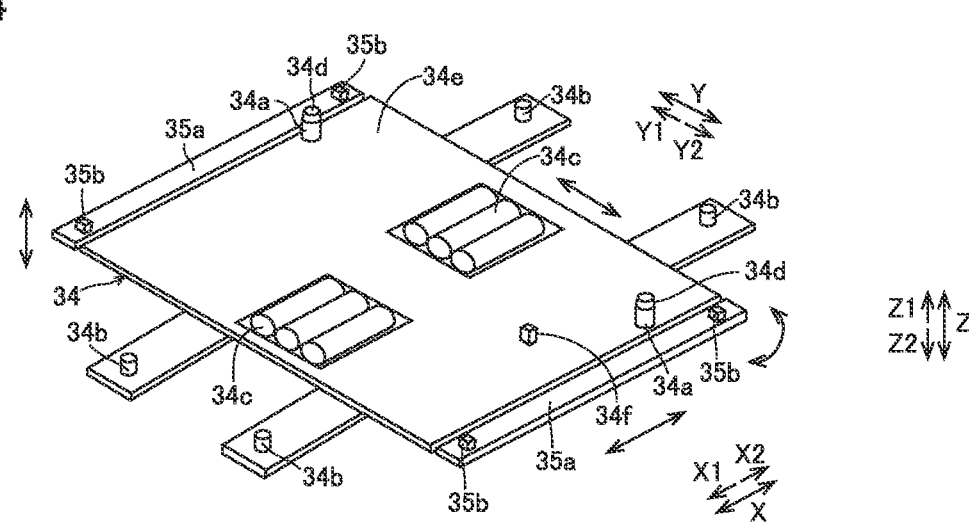
FIG. 4 is a perspective view schematically showing a configuration of a battery mounting table and a raising and lowering unit.

The battery mounting table 34 is disposed below the battery replacement station 100a, more specifically, below the opening 32a. The battery mounting table 34 can mount the batteries 101 and 201 and can move in the vertical direction. As shown in FIG. 4, the battery mounting table 34 includes a base portion 34e, two positioning pins 34a, four locking/unlocking tools 34b, a roller portion 34c, and a stopper 34f.

The base portion 34e is disposed between the pair of elevation bars 35a. The base portion 34e is movable in the vertical direction. The base portion 34e is formed in a flat plate shape. The base portion 34e has an outer shape larger than the outer shape of the batteries 101 and 201. The base portion 34e is configured to be movable in the horizontal direction below the electrically powered vehicle 200. Specifically, the base portion 34e is movable in the X direction (X1 direction, X2 direction) and the Y direction (Y1 direction, Y2 direction). The base portion 34e is rotatable so as to change the direction (angle) in the XY plane. Each of the pair of elevation bars 35a may be movable similarly to the base portion 34e.

Each positioning pin 34a is provided on the base portion 34e. Each positioning pin 34a is a portion for positioning the vehicle body 200a of the electrically powered vehicle 200 and the base portion 34e. One positioning pin 34a is provided at one end of the base portion 34e in a direction (Y direction) parallel to the vehicle width direction. The other positioning pin 34a is provided at the other end of the base portion 34e in a direction (Y direction) parallel to the vehicle width direction.

Figure 5:
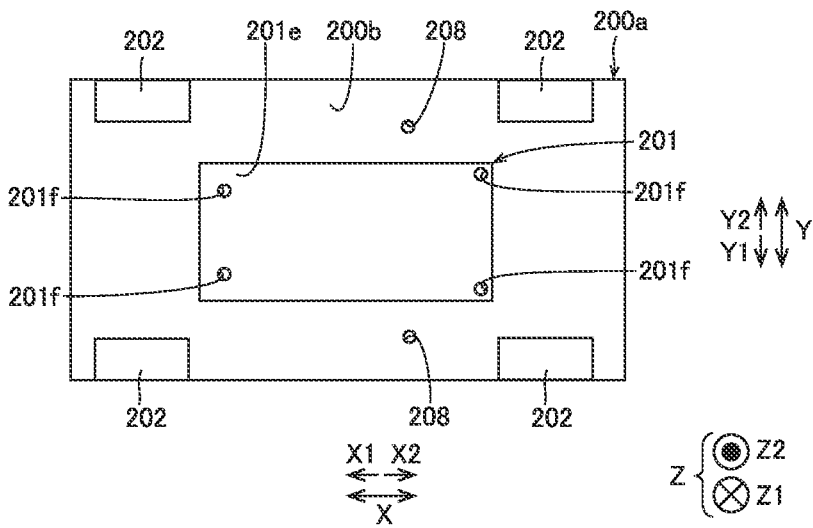
FIG. 5 is a bottom view of the electrically powered vehicle.

As shown in FIG. 5, the vehicle body 200a of the electrically powered vehicle 200 has the lower surface 200bc, and the lower surface 200b is provided with pin insertion holes 208 into which the positioning pins 34a are inserted. Each positioning pin 34a can be inserted into a pin insertion hole.

Each locking/unlocking tool 34b is movable in the vertical direction. Each locking/unlocking tool 34b is movable in the vertical direction with respect to the base portion 34e. As shown in FIG. 4, each locking/unlocking tool 34b is disposed inside the pair of positioning pins 34a in the Y direction. Each locking/unlocking tool 34b is disposed outside the base portion 34e in the X direction.

As shown in FIG. 5, the battery 201 has a bottom surface 201e, and tool insertion holes 201f into which the respective locking/unlocking tools 34b are inserted are formed in the bottom surface 201e. A tool insertion hole is also formed in the bottom surface of the battery 101. Each locking/unlocking tool 34b can be inserted into a tool insertion hole.

The roller portion 34c is provided on the base portion 34e. The roller portion 34c is rotatable around a rotation axis extending in the X direction. When the roller portion 34c rotates in one direction, the batteries 101 and 201 relatively move toward one side (for example, the Y1 side) in the Y direction with respect to the base portion 34e, and when the roller portion 34c rotates in the other direction, the batteries 101 and 201 relatively move toward the other side in the Y direction with respect to the base portion 34e.

The marker 34d is provided at the distal end of each positioning pin 34a. The marker 34d is formed of a light emitting body such as an LED. The marker 34d may be tapered upward.

The stopper 34f is provided on the base portion 34e. The stopper 34f will be described later.

Referring again to FIG. 1, the first transport unit 36 transports the battery 101 stored in the storage 100b toward the battery mounting table 34. Specifically, in the underfloor area 100c, a temporary placement site 40 for temporarily placing the charged battery 101 stored in the storage 100b is provided, and the first transport unit 36 can transport the battery 101 from the temporary placement site 40 toward the battery mounting table 34. The first transport unit 36 may be of a belt conveyor type, for example.

The second transport unit 37 conveys the battery 201 after use, which is detached from the electrically powered vehicle 200 and mounted on the battery mounting table 34, from the battery mounting table 34. Specifically, in the underfloor area 100c, a storage space 42 for storing the battery 201 is provided at a position separated from the storage 100b, and the second transport unit 37 transports the battery 201 from the battery mounting table 34 toward the storage space 42 along a transport direction (Y2 direction) in which the first transport unit 36 transports the battery 101 toward the battery mounting table 34. The first transport unit 36 and the second transport unit 37 are arranged in a straight line. The second transport unit 37 may also be of a belt conveyor type, for example.

A charging facility 52 capable of charging the battery 201 is provided in the storage space 42. The battery 201 stored in the storage space 42 is transported to the storage 100b by a transport unit (not shown) after the charging by the charging facility 52 is completed or during the charging. The transport unit may include a first transport unit 36 and a second transport unit 37.

Here, the stopper 34f will be described. The stopper 34f is provided at a downstream portion of the roller portion 34c in the transport direction (Y2 direction) of the base portion 34e. The stopper 34f contacts the battery 101 conveyed from the first transport unit 36 to the base portion 34e from a direction opposite to the transport direction. The position of the stopper 34f in the direction (Y direction) parallel to the transport direction is set based on the position of the battery 201 mounted on the electrically powered vehicle 200. The stopper 34f is movable in the vertical direction between a protruding position (a position shown in FIG. 4) where the stopper 34f protrudes upward from the base portion 34e so as to abut on the batteries 101 and 201, and an embedded position where the stopper 34f is buried in the base portion 34e so as to allow movement of the battery 201 from the base portion 34e to the second transport unit 37 after use.

The movement of the stopper 34f between the protruding position and the embedded position is controlled by the processor (controller) 11 of the control device 10. The processor 11 positions the stopper 34f at the protruding position when the charged battery 101 moves from the first transport unit 36 to the base portion 34e, and positions the stopper 34f at the embedded position when the used battery 201 moves from the base portion 34e to the second transport unit 37.

(Battery Replacement Method)

Figure 6:
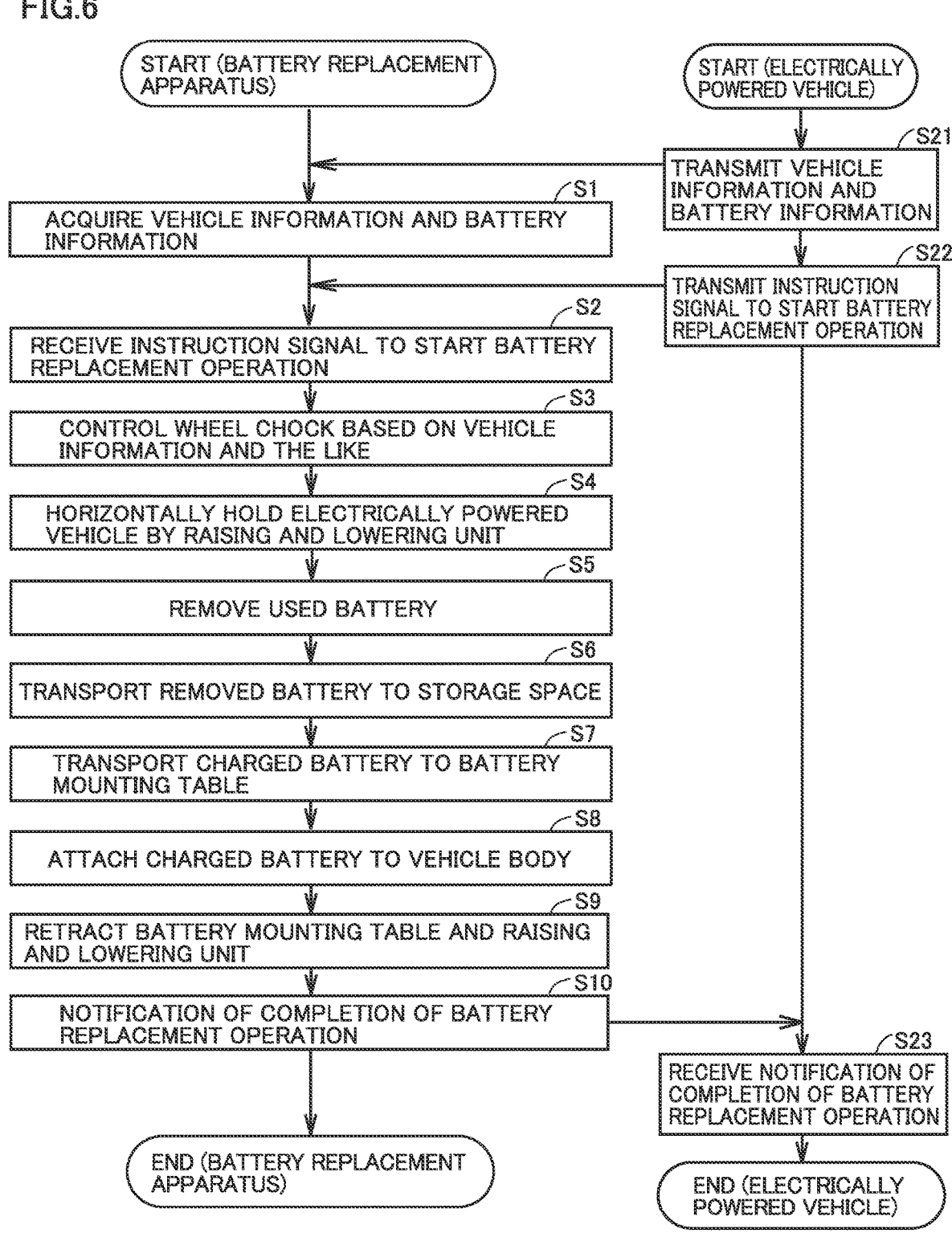
FIG. 6 is a flowchart showing each step of the battery replacement apparatus.

Next, a battery replacement method using the battery replacement apparatus 100 will be described with reference to a flowchart (sequence diagram) of FIG. 6.

[Transmission of Vehicle Information and the Like: Electrically Powered Vehicle]

First, in step S21, the electrically powered vehicle 200 transmits information about the electrically powered vehicle 200 and information about the battery 201 to the communication unit 13 of the battery replacement apparatus 100. For example, when an operation of transmitting the above information is performed in a navigation system (not shown) of the electrically powered vehicle 200, the above information is transmitted to the communication unit 13. The electrically powered vehicle 200 transmits the above information before entering the battery replacement apparatus 100. The above information may be transmitted after the electrically powered vehicle 200 has entered the battery replacement apparatus 100.

[Acquisition of Vehicle Information and the Like: Battery Replacement Apparatus]

Next, in step S1, the communication unit 13 of the battery replacement apparatus 100 acquires information about the electrically powered vehicle 200 and information about the battery 201 transmitted from the electrically powered vehicle 200 in step S21 by communication. The acquired information is stored in the memory 12 (see FIG. 1).

The communication unit 13 also controls the capacity (charge capacity) of the battery 201 and the SOC (State Of) of the battery 201.

Information of Charge) may be acquired.

[Transmission of an Instruction Signal for Battery Replacement Work: Electrically Powered Vehicle]

Next, in step S22, the electrically powered vehicle 200 stopped in the vehicle stop area 103 transmits an instruction signal for starting the battery replacement operation to the communication unit 13.

[Receiving an Instruction Signal for a Battery Replacement Operation: Battery Replacement Apparatus]

Next, in step S2, the communication unit 13 receives the instruction signal transmitted from the electrically powered vehicle 200 in step S22. In step S2, after receiving the instruction signal, the processor 11 may transmit an instruction message or the like for turning off the ignition power supply to the user of the electrically powered vehicle 200 through the communication unit 13.

[Control of Wheel Chock: Battery Replacement Apparatus]

Next, in step S3, the processor 11 adjusts the position of the wheel chock 31 (see FIG. 2) based on the information (vehicle information and battery information) acquired through the communication unit 13 in step S1. Note that the processor 11 may control each of the four wheel chocks 31 independently of each other.

Thus, the position and orientation of the vehicle body 200a in the horizontal direction are adjusted, and the position and orientation of the battery 201 in the horizontal direction are adjusted. As a result, the battery 201 is moved to a predetermined position above the opening 32a.

[Holding the Vehicle Body Horizontally: Battery Replacement Apparatus]

Next, in step S4, the processor 11 raises the raising and lowering unit 35 in a state where the shutter 32 is in the open state and the shutter 32 is in the open state. Thus, after passing through the opening 32a, the raising and lowering unit 35 lifts the electrically powered vehicle 200 such that the height H of the lower surface 200b of the vehicle body 200a from the floor FL becomes a predetermined height (see FIG. 3).

[Removal of the Battery after Use: Battery Replacement Apparatus]

Figure 7:
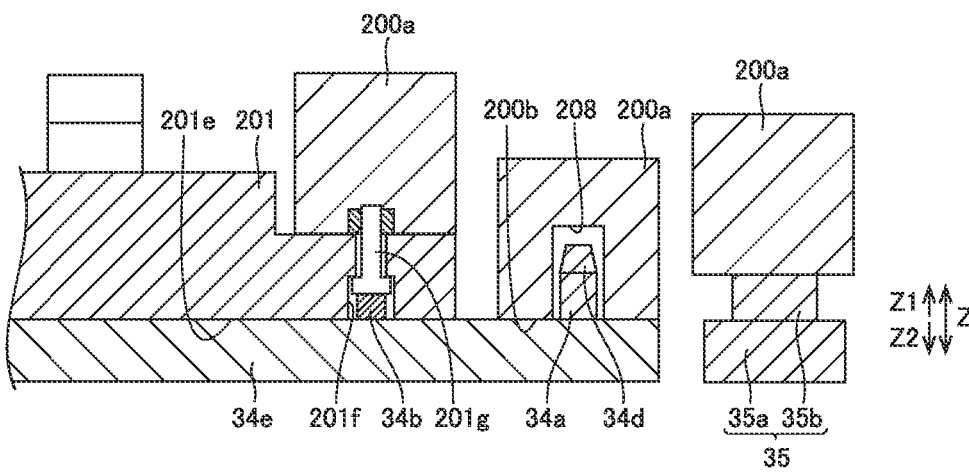
FIG. 7 is a view schematically showing a state in which the battery mounting table and the electrically powered vehicle are positioned with respect to each other.

Next, in step S5, the battery 201 after use is detached from the vehicle body 200a of the electrically powered vehicle 200. First, the processor 11 raises the battery mounting table 34. Thereby, as shown in FIG. 7, the positioning pin 34a is inserted into the pin insertion hole 208 formed in the lower surface 200b of the vehicle body 200a, the locking/unlocking tool 34b is inserted into the tool insertion hole 201f formed in the bottom surface 201e of the battery 201, and the base portion 34e comes into contact with or approaches the bottom surface 201e of the battery 201. As a result, the battery mounting table 34 is positioned with respect to the electrically powered vehicle 200 (battery 201). At this time, the positioning pin 34a is inserted into the pin insertion hole 208 before the locking/unlocking tool 34b is inserted into the tool insertion hole 201f.

Next, the processor 11 raises the locking/unlocking tool 34*b* in a state where the locking/unlocking tool 34*b* is inserted into the tool insertion hole 201*f*. Then, the processor 11 drives (rotates) the locking/unlocking tool 34*b* inserted into the tool insertion hole 201*f*. Thereby, the bolt 201*g* in the tool insertion hole 201*f* is unlocked. As a result, the battery 201 is detached from the vehicle body 200*a* and mounted on the base portion 34*e*. The timing at which the positioning pin 34*a* is inserted into the pin insertion hole 208 and the timing at which the locking/unlocking tool 34*b* is inserted into the tool insertion hole 201*f* may be the same.

[Transport the Battery after Use to the Storage Space: Battery Replacement Apparatus]

Next, in step S6, the battery 201 removed from the vehicle body 200*a* in step S8 is transported to the storage space 42 (see FIG. 1). First, the processor 11 lowers the battery mounting table 34 on which the battery 201 is mounted to the height position of the second transport unit 37 (see FIG. 1). Next, the processor 11 lowers the raising and lowering unit 35 to a position below the battery mounting table 34 (for example, a position shown in FIG. 1). As a result, since the vehicle body 200*a* is not held by the raising and lowering unit 35, the electrically powered vehicle 200 is placed on the floor FL of the vehicle stop area 103. At this time, the processor 11 positions the stopper 34*f* at the embedded position. Subsequently, the processor 11 drives the roller portion 34*c* (see FIG. 4) of the battery mounting table 34 so that the battery 201 moves on the base portion 34*e* in the transport direction (Y2 direction). Thereby, the battery 201 mounted on the base portion 34*e* moves on the base portion 34*e* toward the second transport unit 37 without abutting on the stopper 34*f*, and moves from the base portion 34*e* to the second transport unit 37. The battery 201 is transported to and stored in the storage space 42 by the second transport unit 37. The battery 201 may be charged at the charging facility 52 in the storage space 42. The battery 201 is transported to the storage 100*b* by the transport unit after the charging is completed or during the charging.

[Transporting the Charged Battery to a Battery Mounting Table: Battery Replacement Apparatus]

Next, in step S7, the processor 11 conveys the charged battery 101 stored in the storage 100*b* to the battery mounting table 34. Specifically, after the processor 11 conveys the battery 101 from the storage 100*b* to the temporary placement site 40 in the underfloor area 100*c*, the processor 11 conveys the battery 101 from the temporary placement site 40 to the battery mounting table 34 by the first transport unit 36 along the transport direction (Y2 direction). At this time, the processor 11 positions the stopper 34*f* at the protruding position. When the battery 101 moves from the first transport unit 36 to the base portion 34*e*, the processor 11 drives the roller portion 34*c* so that the battery 101 moves on the base portion 34*e* in the transport direction. As a result, the battery 101 stops at a predetermined position on the base portion 34*e* by abutting against the stopper 34*f*.

[Mounting of Charged Battery: Battery Replacement Apparatus]

Next, in step S8, the processor 11 performs control to attach the charged battery 101 to the vehicle body 200*a*. Specifically, the processor 11 raises the raising and lowering unit 35 so that the height H of the lower surface 200*b* of the vehicle body 200*a* from the floor FL of the vehicle stop area 103 becomes a predetermined height.

Next, the processor 11 raises the battery mounting table 34. Thereby, the positioning pin 34*a* is inserted into the pin insertion hole. In this state, the processor 11 raises the locking/unlocking tool 34*b*. Thereby, the locking/unlocking tool 34*b* is inserted into the tool insertion hole of the battery 101. Then, the processor 11 drives (rotates) the locking/unlocking tool 34*b*. Thus, the bolt in the tool insertion hole is locked. When it is detected that all the bolts have been locked, the vehicle side connector (not shown) and the connector (not shown) of the battery 101 are locked. As a result, the mounting of the charged battery 101 to the vehicle body 200*a* is completed.

[Retraction of the Battery Mounting Table and the Raising and Lowering Unit: Battery Replacement Apparatus]

Next, in step S9, the processor 11 lowers the battery mounting table 34 and the raising and lowering unit 35 and retracts the battery mounting table 34 and the raising and lowering unit 35 from the electrically powered vehicle 200. Thereafter, the processor 11 closes the shutter 32 (see FIG. 2).

[Notification of Completion of Battery Replacement Work: Battery Replacement Apparatus]

Next, in step S10, the processor 11 notifies the electrically powered vehicle 200 of the completion of the battery replacement operation through the communication unit 13.

[Receipt of the Battery Replacement Work Completion Notification: Electrically Powered Vehicle]

In step S23, the electrically powered vehicle 200 receives the notification transmitted from the communication unit 13 of the battery replacement apparatus 100 in step S10. Thus, the electrically powered vehicle 200 is brought into a state in which the ignition power supply can be turned on. Thereafter, the process ends.

In the above embodiment, the position of the drive device 30 is adjusted based on the information about each of the electrically powered vehicle 200 and the battery 201, but the present disclosure is not limited thereto. The position of the drive device 30 may be adjusted based on information about either the electrically powered vehicle 200 or the battery 201.

As described above, in the battery replacement apparatus 100 according to the present embodiment, since the storage space 42 in which the battery 201 after being removed from the electrically powered vehicle 200 is stored is provided at a position separated from the storage 100*b* in which the charged battery 101 attached to the electrically powered vehicle 200 is stored, management of the batteries 101 and 201 is simplified.

It will be appreciated by those skilled in the art that the exemplary embodiments described above are specific examples of the aspects described below.

[Aspect 1]

A battery replacement apparatus for replacing a used first battery attached to an electrically powered vehicle with a charged second battery, the battery replacement apparatus comprising:

a battery replacement station where removal of the first battery from the electrically powered vehicle and attachment of the second battery to the electrically powered vehicle are performed;

a storage that stores the second battery; and a storage space that is provided at a position separate from the storage and stores the first battery.

In this aspect, the storage space in which a used battery removed from an electrically powered vehicle is stored is provided at a position separate from the storage in which a charged battery to be attached to the electrically powered vehicle is stored, and therefore, management of the battery is simplified.

[Aspect 2]

The battery replacement apparatus according to aspect 1, further comprising a charging facility that is provided in the storage space and capable of charging the first battery.

In this aspect, a used battery can be charged in the storage space.

[Aspect 3]

The battery replacement apparatus according to aspect 1 or 2, further comprising:

a battery mounting table which is disposed below the battery replacement station, on which the first battery and the second battery can be mounted, and which is movable in a vertical direction;

a first transport unit that transports the second battery stored in the storage toward the battery mounting table; and a second transport unit that transports the first battery removed from the electrically powered vehicle, from the battery mounting table to the storage space, wherein the second transport unit transports the first battery from the battery mounting table toward the storage space, in a transport direction in which the first transport unit transports the second battery toward the battery mounting table.

[Aspect 4]

The battery replacement apparatus according to aspect 3, wherein the battery mounting table includes:

a base portion on which the first battery and the second battery can be mounted and which is movable in the vertical direction; and a stopper that is provided on the base portion and brought into contact, in a direction opposite to the transport direction, with the second battery transported from the first transport unit to the base portion, and the stopper is movable between a protruding position where the stopper protrudes upward from the base portion to contact the second battery, and an embedded position where the stopper is embedded in the base portion to allow the first battery to move from the base portion to the second transport unit.

In this aspect, positioning of a charged battery transported from the first transport unit to the battery mounting table and movement of a used battery removed from an electrically powered vehicle from the battery mounting table to the second transport unit are both achieved.

[Aspect 5]

The battery replacement apparatus according to aspect 4, further comprising a control device that is capable of controlling the stopper, wherein the control device causes the stopper to be positioned at the protruding position when the second battery is moved from the first transport unit to the base portion, and causes the stopper to be positioned at the embedded position when the first battery is moved from the base portion to the second transport unit.

In this aspect, positioning of a charged battery transported from the first transport unit to the battery mounting table and movement of a used battery removed from an electrically powered vehicle, from the battery mounting table to the second transport unit, are automatically achieved.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A battery replacement apparatus for replacing a used first battery attached to an electrically powered vehicle with a charged second battery, the battery replacement apparatus comprising:

a battery replacement station where removal of the first battery from the electrically powered vehicle and attachment of the second battery to the electrically powered vehicle are performed;

a storage that stores the second battery;

a storage space that is provided at a position separate from the storage and stores the first battery;

a battery mounting table which is disposed below the battery replacement station, on which the first battery and the second battery can be mounted, and which is movable in a vertical direction;

a first transport unit that transports the second battery stored in the storage toward the battery mounting table; and a second transport unit that transports the first battery removed from the electrically powered vehicle, from the battery mounting table to the storage space, wherein the second transport unit transports the first battery from the battery mounting table toward the storage space, in a transport direction in which the first transport unit transports the second battery toward the battery mounting table, wherein the battery mounting table includes:

a base portion on which the first battery and the second battery can be mounted and which is movable in the vertical direction; and a stopper that is provided on the base portion and brought into contact, in a direction opposite to the transport direction, with the second battery transported from the first transport unit to the base portion, and wherein the stopper is movable between a protruding position where the stopper protrudes upward from the base portion to contact the second battery, and an embedded position where the stopper is embedded in the base portion to allow the first battery to move from the base portion to the second transport unit.

2. The battery replacement apparatus according to claim 1, further comprising a charging facility that is provided in the storage space and capable of charging the first battery.

3. The battery replacement apparatus according to claim 1, further comprising a controller that is capable of controlling the stopper, wherein the controller causes the stopper to be positioned at the protruding position when the second battery is moved from the first transport unit to the base portion, and causes the stopper to be positioned at the embedded position when the first battery is moved from the base portion to the second transport unit.

* * * * *